United States Patent [19]
Schlemmer

[11] Patent Number: 6,081,754
[45] Date of Patent: Jun. 27, 2000

[54] METHOD OF COMMAND CONTROL FOR INTERACTIVE PATH GUIDANCE OF KINEMATICALLY-REDUNDANT MANIPULATOR

[75] Inventor: Maximilian Schlemmer, Seeshaupt, Germany

[73] Assignee: Deutsches Zentrum fur luft-und Raumfahrt E.V., Bonn, Germany

[21] Appl. No.: 09/017,485

[22] Filed: Feb. 2, 1998

[30] Foreign Application Priority Data

Feb. 3, 1997 [DE] Germany ............................ 197 03 915

[51] Int. Cl.$^7$ .................................................. G05B 13/00
[52] U.S. Cl. ...................................... 700/263; 318/568.11
[58] Field of Search ..................... 318/567.11, 156.11; 901/9, 30; 700/263, 262, 253

[56] References Cited

U.S. PATENT DOCUMENTS

| | | | |
|---|---|---|---|
| 5,159,249 | 10/1992 | Megherbi | 318/568.1 |
| 5,430,643 | 7/1995 | Seraji | 700/263 |
| 5,550,953 | 8/1996 | Seraji | 700/263 |

OTHER PUBLICATIONS

Hu, "Relation Between Global Velocity and Local Torque Optimization of Redundant Manipulators", *Journal of Robotics Systems*, vol. 11, No. 4, pp. 271–279, (1994).

Schlemmer, "On–line Trajectory Optimization for Kinematically Redundant Robot–Manipulators and Avoidance of Moving Obstacles", *Institute of Electrical and Electronics Engineers*, vol. 1, pp474–479, (1996).

Sadegh, "Optimal Kinematic Control of Constrained and Redundant Manipulators", *Institute of Electrical and Electronics Engineers*, vol. 1, pp. 620–625, (1992).

*Primary Examiner*—Paul P. Gordon
*Assistant Examiner*—Kidest Bahta
*Attorney, Agent, or Firm*—Browdy and Neimark

[57] ABSTRACT

Beginning with a successive commanded end-effector destination shift, the method of the invention, which includes a calculation corresponding to a special algorithm of inverse kinematics using the Jacobi Matrix in the control of a manipulator, effects an optimization of weighted criteria (energy criteria and reference-position criteria) in a real time cycle. The method of the invention can be used in interactive path guidance of a kinematically-redundant manipulator.

5 Claims, 1 Drawing Sheet

METHOD OF COMMAND CONTROL FOR INTERACTIVE PATH GUIDANCE OF KINEMATICALLY-REDUNDANT MANIPULATOR

FIELD OF THE INVENTION

The invention relates to a method of command control for an interactive path guidance of a kinematically-redundant manipulator based on end-effector destination shifts commanded by a programmer with the aid of a manual control ball or the like, in connection with a calculation according to an algorithm of inverse kinematics with the use of the Jacobi Matrix of kinematics.

REVIEW OF THE RELATED TECHNOLOGY

Methods of command control for a path guidance of a kinematically-redundant manipulator on the basis of end-effector destination shifts commanded by a programmer, in connection with a calculation according to an algorithm of inverse kinematics using the Jacobi Matrix, are known from Siciliano, B., Sciavicco, L.; "Modelling and Control of Robot Manipulators," McGraw-Hill Companies (1996), pp. 95 to 101, and Vukobratovic, M., Kircanski, N.: "Kinematics and Trajectory Synthesis of Manipulation Robots," Springer-Verlag, Tokyo, 1986, pp. 105 to 122.

In this connection, a known method that includes a calculation of a generalized inverse of the Jacobi Matrix possesses a few advantageous properties, but is also associated with a number of disadvantages. For example, a smoothness of the calculated articulated path and low wear of the robot drive are attained through minimization of the local articulated position offset (local energy criteria). In addition, the spacing between the articulated positions of the physical articulated stops is taken into consideration through the optimization of global criteria in the zero space of the Jacobi Matrix. Disadvantages of this method are that it cannot guarantee that path limitations will be maintained with physical articulated stops, an unstable behavior occurs in singular robot position due to a (generalized) inversion of the Jacobi Matrix, and inefficient robot path courses are possible when conflicting local and global criteria exist.

In another known method, in which a calculation of the transposed Jacobi Matrix is performed, the commanded end-effector destination is attained iteratively corresponding to a representation of reverse kinematics. An advantageous feature of this method is a stable behavior in singular robot positions, because the Jacobi Matrix is not inverted. However, path limitations are not considered with physical articulation stops and maximum articulation speeds. Superordinate heuristics must be constructed to meet these requirements. Inefficient path courses occur in the form of interference movements of the end effectors, because the cartesian linear movement commanded by the manual control ball cannot be transferred exactly to the end effector of the manipulator. Moreover, the robot drive is subjected to high material wear due to abrupt passage through singular robot positions and because of a generally insufficiently-smooth articulation path (no consideration of local energy criteria). A further negative consequence is a low convergence speed, that is, a sacrifice of real-time capability, because no practical, optimum strategy is known for determining the positively-defined cartesian stiffness matrix.

DE 33 44 633 C2 describes a real-time control in which the redundant articulations that are not necessary for the movement of an end effector are held securely for calculating the articulation speed, which simplifies the calculation of the inverse Jacobi Matrix. This type of calculation is performed for at least one of the articulation combinations. The speeds for each articulation are then determined through averaging of the calculated articulation speed. Thus, in the prior art, a weighting of the articulation speeds takes place.

U.S. Pat. No. 5,430,643 also describes a real-time method; in this case, the inverse Jacobi Matrix is calculated. The method known from this U.S. patent document takes into consideration weight values for the articulation speeds, as well as path limitations for at least a graphic simulation of the robot's movements.

SUMMARY OF THE INVENTION

It is the object of the invention to provide a method of command control for an interactive path guidance of a kinematically-redundant manipulator, with which path limitations are reliably maintained through physical articulation stops and maximum allowable articulation speeds, and no superordinate heuristics are required for checking the determined solution for allowability with respect to the path limitations, and making corrections if necessary.

In accordance with the invention, which relates to a method of command control for an interactive path guidance of a kinematically-redundant manipulator of the type mentioned at the outset, this object is accomplished in that beginning with a commanded end-effector destination shift and the current actual value ($q_i$) of the articulation position of the manipulator, a new articulation position ($q_{i+1}$) is calculated with consideration of a quality function (f(q)), which is parameterized by non-negative weighting values ($\alpha_j$, $\beta_j$)

and consideration of path limitations through physical articulation stops ($q_{min}$, $q_{max}$), maximum articulation speed ($\dot{q}_{max}$) and the kinematic equation represented by the Jacobi Matrix, which articulation position predetermines the new values for the articulation regulator, with the quality function being the sum of energy criterion and reference-position criterion, the energy criterion being calculated from $(q-q_i)^t \mathrm{diag}(\alpha_j)(q-q_i)$ and the reference-position criterion being calculated form $(q-q_{ref})^t \mathrm{diag}(\beta_j)(q-q_{ref})$ and the value $q_{ref}$ being a predetermined articulation-position value that is determined such that the sequence of calculated articulation-position values ($q_i$) runs near this reference-position value;

beginning with an articulation-position value $q_1$ as a starting point, an allowable optimization vector is determined on the basis of the quality function with respect to all active constraints that indicate which path limitations have been attained, and this vector is scaled according to the inactive constraints that indicate which path limitations have not been attained;

the scaled optimization vector is added to the articulation-position value calculated in the previous iteration step;

and the optimum quality of these articulation-position values is evaluated based on the quality function and the constraints activated in the newly-calculated articulation position.

According to an advantageous refinement to the method of the invention, the Jacobi Matrix of kinematics is used to define the desired cartesian, translatoric (transactional) or rotary end-effector destination shift $\Delta x^d_t$ and $\Delta x^d_r$ per sampling time $\Delta T$ starting with a commanded end-effector destination shift $\Delta x_c := (\Delta x_t, \Delta x_r)$ at a time $T_j$, with $\Delta x_t \in \mathfrak{R}^3$ and $\Delta x_r \in \mathfrak{R}^3$ respectively indicating the translatoric or rotary component of the commanded end-effector destination shift, and $\Delta x^{max}_t$ and $\Delta^{max}_r$ respectively defining the maximum (scalar-value), translatoric or rotary, cartesian position offset of the end effector per sampling time $\Delta T$:

$$\Delta x^d_t := \begin{cases} \Delta x_t & \text{if } |\Delta x_t| \leq \Delta x^{max}_t \\ \Delta x_t \frac{|\Delta x_t|}{\Delta x^{max}_t} & \text{otherwise} \end{cases}$$

$$\Delta x^d_r := \begin{cases} \Delta x_r & \text{if } |\Delta x_r| \leq \Delta x^{max}_r \\ \Delta x_r \frac{|\Delta x_r|}{\Delta x^{max}_r} & \text{otherwise} \end{cases}$$

(the quantity $|x|$ of a vector x is determined here and hereinafter by its euclidian norm $$|x| = \sqrt{\left(\sum_i x_i^2\right)},$$

the desired end-effector destination shift is explained by $\Delta x_d := (\Delta x^d_r, \Delta x^d_t)$, and the energy criteria and reference-position criteria can be suitably weighted corresponding to the predominant, problem-specific requirements in that each axis j is allocated two positive numerical values $\alpha_j$, $\beta_j$, which are predetermined by the programmer, with the value $\alpha_j$ serving in the weighting of an energy criterion that evaluates the difference between two adjacent, calculated articulation positions of axis j, and the value $\beta_j$ serving in the weighting of a criterion that evaluates the deflection of the articulation position $q_j$ from a reference value $q_{ref\,j}$, which is also predetermined by the programmer, like the physical articulation stops $q_{min}$, $q_{max}$ of the manipulator, which relate to path limitations, and the articulation-speed limitations $q'_{max}$, such that an allowable, optimum articulation-position offset $\Delta q^i$ is calculated in the attainment of the method's output values to effect a desired end-effector destination shift $\Delta x^i_d$ at time $T_{i-1}$ during the time interval $\Delta T$, with the algorithm of inverse kinematics that progresses in an initialization phase and a subsequent optimization phase. The current nominal value is provided to the articulation regulators from $q^{i+1}_{soll} := q^i_{soll} + \Delta q^i$ (the articulation regulators correspondingly proceed with $q^i_{soll}$); allowable articulation-position offset is understood to mean that the articulation-position value that has been updated with $\Delta q$ satisfies the physical articulation stops $q_{min}$, $q_{max}$ corresponding to $q_{min} \leq q_{soll} + \Delta q \leq q_{max}$, and $\Delta q$ satisfies the articulation speed limitations $q'_{max}$ corresponding to $|\Delta q| \leq q'_{max} \Delta T$, and that the type of optimum quality of $\Delta q$ can be determined by a programmer through the quality-criterion weighting $\alpha, \beta$, and the sampling time $\Delta T$ is dimensioned, corresponding to $\Delta T \geq \max(\Delta t_q, \Delta t_r)$, such that the computing time $\Delta t_q$ for calculating an optimum, allowable articulation-position offset $\Delta q$, and the adjustment time $\Delta t_r$, which the regulators require for adapting the axial positions to the nominal values $q_{soll}$, lie within the time span $\Delta T$.

BRIEF DESCRIPTION OF THE DRAWING

In connection with the above-described features of the invention.

Figure 1:
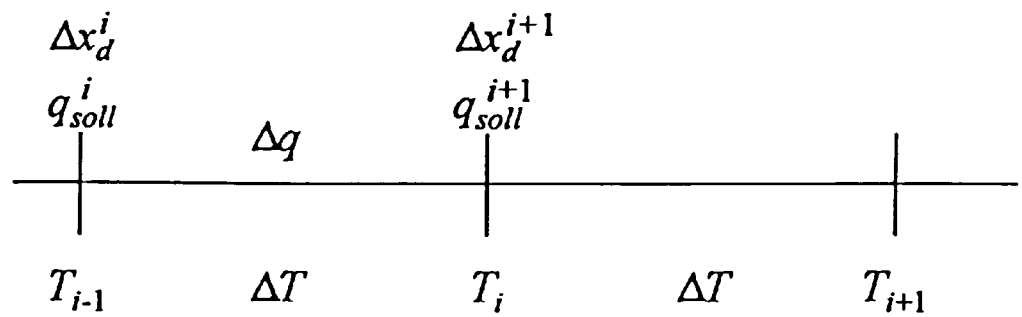
FIG. 1 illustrates a representation of the input/output flux of the inverse kinematics in a real-time grid.
Figure 2:
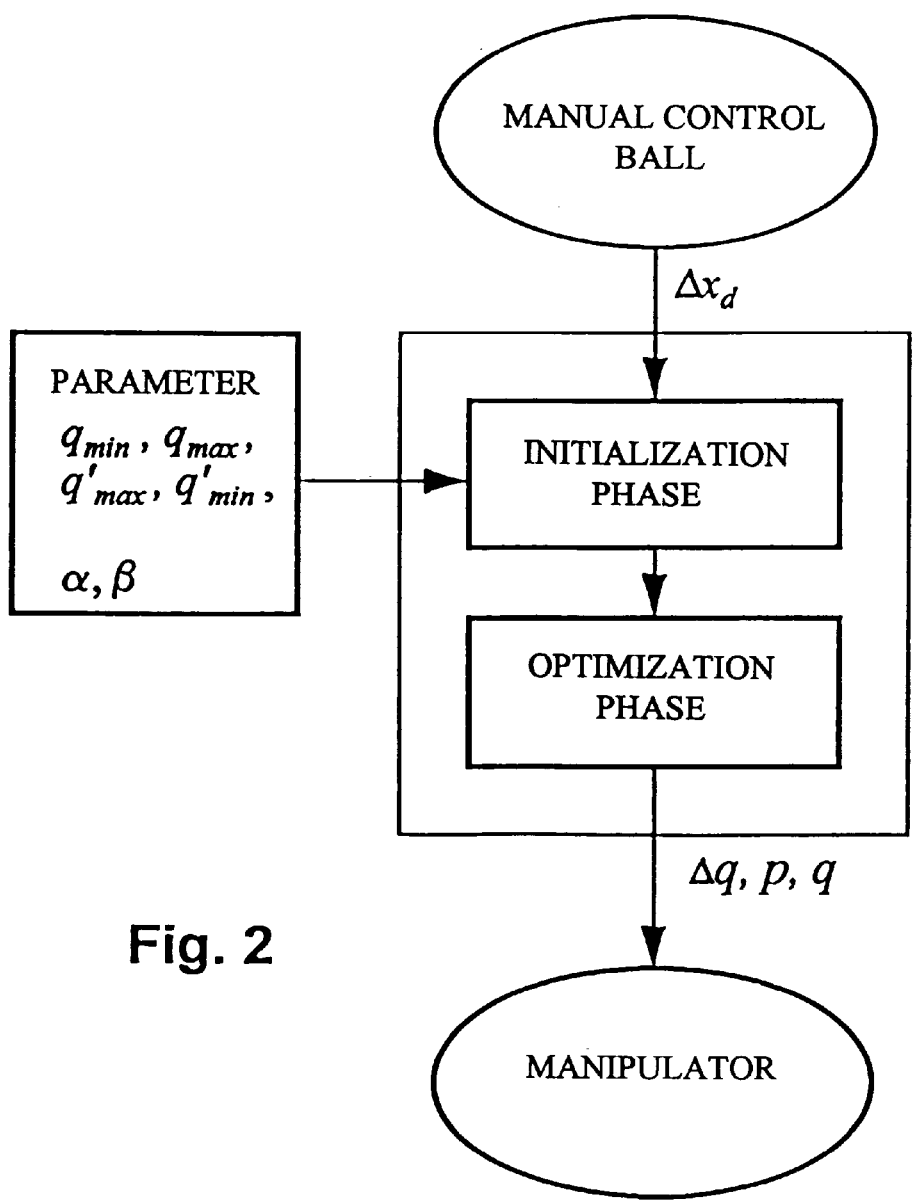

The base structure of the special method of the invention, which utilizes an inverse kinematics for command control, is illustrated schematically in FIG. 2.

DETAILED DESCRIPTION OF THE PREFERRED EMBODIMENT

The method of the invention results in a smoothness of the calculated articulation path, and low wear of the robot drive through minimization of the local articulation-position offset (local energy criteria). "Narrow" articulation paths around a reference position (e.g., zero position) are attained. Articulation stops are advantageously avoided extensively, or approached gently or with low wear. This behavior is caused by a delay effect of the robot axes, which acts proportionally to the distance from the reference position. In addition, a stable behavior occurs in singular robot positions, because the Jacobi Matrix is not inverted. Another advantage is the occurrence of efficient path courses through the exact transfer of the cartesian linear movement commanded by the manual control ball to the end effector of the manipulator.

The following is an algorithmic description of the method of the invention.

$J_i$, i=1, . . . , ndof indicates the columns of the Jacobi Matrix of kinematics, in point $q_0$ of the current manipulator position, ndof indicates the number of articulations and $\epsilon_i := q'_{max} \Delta T$ indicates the maximum allowed articulation-position offset per sampling time $\Delta T$. With $$y_i := \frac{\Delta q^i}{\epsilon_i}$$

and $J_\epsilon := (J_1 \epsilon_1, J_2 \epsilon_2, \ldots, J_{ndof} \epsilon_{ndof})$, the incremental kinematic equation is as follows:

$$(p\Delta x^d_t, q\Delta x^d_r) = J_\epsilon y. \quad (1)$$

Because of the path limitations, the following box limitations result for $$y^i_{min} := \max\left(-1, \frac{q^i_{min} - q^i_0}{\epsilon_i}\right),$$

$$y^i_{max} := \min\left(1, \frac{q^i_{max} - q^i_0}{\epsilon_i}\right).$$

Here $q_0$ indicates the most recently calculated, allowable nominal-position set, to whose values the axes of the robot have already been adjusted, the values representing the actual value.
Further define:

$$y^i_{ref} := \frac{q^i_{ref} - q^i_0}{\epsilon_i}.$$

So that all path limitations can be met, according to the kinematic equation (1), the desired end-effector destination shift is subjected to a centric extension described in the form of two scalars:

$$0 \leq p \leq 1, \; 0 \leq q \leq 1.$$

The values p, q are maximized with the method of the invention such that all path limitations are maintained.
Define $b := (0,0,0,0,0,0,y_{min},0,0,-y_{max},-1,-1) \in \mathfrak{R}^{2n+6}$, $x := (y,p,q)$ and the auxiliary values $\Delta x_t := (\Delta x^d_t, 0,0,0) \in \mathfrak{R}^6, \Delta x_r := (0,0,0,\Delta x^d_r) \in \mathfrak{R}^6$ and the matrix $A \in \mathfrak{R}^{2n+6,n}$ with n:=ndof+2:

$$A := \begin{pmatrix} J_e, & -\Delta x_t, & -\Delta x_r \\ & I_n & \\ & -I_n & \end{pmatrix} \quad (2)$$

Here $I_n \in \Re^{n,n}$ indicates the unit matrix. Furthermore, $a_i$, $i=1, \ldots, 2n+6$ indicate the lines of A.

The weights $\alpha$, $\beta$ of the criteria are represented by the diagonal matrix $\Lambda \in \Re^{n,n}$, as the Cholesky factor of the Hess Matrix, from the scaled sum of the energy criterion $(q-q_0)^t \text{diag}(\alpha_i)(q-q_0)$ and the reference-position criterion $(q-q_{ref})^t \text{diag}(\beta_j)(q-q_{ref})$. Their main diagonal elements are:

$$\Lambda_{i,i} := \sqrt{2(\alpha_i^{scal} + \beta_i^{scal})} \text{ for } 1 \leq i \leq n-2$$

and $$\Lambda_{i,i} := \sqrt{2} \text{ for } n-2 < i \leq n,$$

with $$\alpha_i^{scal} := \alpha_i \frac{1}{ndof}$$

and $$\beta_i^{scal} := \beta_i \frac{\varepsilon_i}{ndof(q_{max}^i - q_{min}^i)}.$$

The base structure of the special method of the invention, which utilizes an inverse kinematics for command control, is illustrated schematically in FIG. 2.

An algorithm used in the method of the invention for inverse kinematics is described in more detail in conjunction with FIG. 2. In the used algorithm of inverse kinematics, first an initialization phase configured as follows is performed:

counting index: $k=0$; starting value: $x_k=(y_k,p_k,q_k)=0$; kmax>7; use $m_k:=8$ to initialize the matrix of active constraints $\hat{A}^t \in \Re^{m_k,n}$:

$$\hat{A}^t := \begin{pmatrix} J_e, & -\Delta x_t, & -\Delta x_r \\ 0, & 1, & 0 \\ 0; & 0; & 1 \end{pmatrix};$$

initialize the index quantity $J_k:=(j^1_k, j^2_k, \ldots, j^{2n+6}_k)$ for characterizing the active, singular and inactive, constraints:

$$j_k^i := \begin{cases} n+5 & \text{for } i = 7 \\ n+6 & \text{for } i = 8 \\ i-2 & \text{for } i = 9, \ldots, n+6 \\ i & \text{otherwise} \end{cases};$$

initialize the orthogonal triangular factorization of $\hat{A}$:

$$(r_k, J_k, Y_k, Z_k, L_k, S_k) := \Phi^A_0(\hat{A}, m_k, J_k);$$

initialize the orthogonal, regular triangular factorization of $Z:=\Lambda Z_k$:
$(Q^Z_k, R^Z_k) := \Phi^Z_0(Z, r_k)$;
initialize the vector
$g_0 \in R^n : g_k := 2(\beta^{scal}_1(y^1_k - y^1_{ref}) + \alpha^{scal}_1 y^1_k, \ldots, \beta^{scal}_{ndof}$
$(y^{ndof}_k - y^{ndof}_{ref}) + \alpha^{scal}_{ndof} y^{ndof}_k, p_k - 1, q_k - 1)$.
The following abbreviated form is used for $g_k$:

$$2(\beta^{scal}_i(y^i_k - y^i_{ref}) + \alpha^{scal}_i y^i_k, p_k - 1, q_k - 1).$$

In the used algorithm of inverse kinematics, an optimization phase constructed as follows is next:
I. Calculate the direction of optimization $d_k$:

$$R^Z_k d_{aux} = -Q^Z_k Z_k g_k.$$

From this, determine $d_{aux}$ through reverse substitution.

$$R^Z_k d_z = Q^Z_k d_{aux}.$$

From this, determine $d_z$ through reverse substitution. Define the direction of optimization:

$$d_k := Z_k d_z.$$

II. Determine the maximum step width $s_k$ and the index $j^{i0}_k$ of the limiting secondary condition:

$$s_k := \begin{cases} \min_j \left\{ \frac{b_j - a_j^t x_k}{a_j^t d_k} \text{ with } j = j_k^i \right\} = : \frac{b_{j0} - a_{j0}^t x_k}{a_{j0}^t d_k} \text{ with } j_k^{i0} := j0; & \text{with } a_j^t d_k < 0 \text{ and } \forall i > m_k \\ 1 & \text{if } a_j^t d_k \geq 0, \forall i > m_k \text{ with } j = j_k^i \end{cases}$$

(In the event of ambiguity, select the j0 having the smallest index i0.)

III. Check optimum quality and update all matrix and index values.

(a) If $s_k < 1$ (secondary condition $j^{i0}_k$ has become active):
  i. If $m_k < n$ (there are still inactive constraints):
     $x_{k+1} = x_k + s_k d_k, x_{k+1} = (y_{k+1}, p_{k+1}, q_{k+1})$;
     $g_{k+1} = 2(\beta^{scal}_i(y^i_{k+1} - y^i_{ref}) + \alpha^{scal}_i y^i_{k+1}, p_{k+1} - 1, q_{k+1} - 1)$.

Update matrix factorizations and index quantity:
     $(r_{k+1}, m_{k+1}, J_{k+1}, Y_{k+1}, Z_{k+1}, L_{k+1}, S_{k+1}) := \Phi^A_+(i0, r_k, m_k, J_k, Y_k, Z_k, L_k, S_k)$.
     Check $x_{k+1}$ for optimum quality:
     If $Z^q_{k+1} g_{k+1} = 0$;
     and $\lambda_{k+1} = LLS(r_{k+1}, m_{k+1}, g_{k+1}, Y_{k+1}, L_{k+1}) \geq 0$
     then: Go to Step IV.
     Otherwise: $k=k+1$ (increase iteration index)
     If $k > kmax$: Go to Step IV.
     Otherwise: Determine the orthogonal, regular triangular factorization of
     $\overline{Z} := \Lambda Z_{k+1}$:
     $(Q^Z_{k+1}, R^Z_{k+1}) := \Phi^Z(\overline{Z}, r_{k+1})$.
     Go to Step I.
  ii. If $m_k = n$ (corner of the allowable range is attained; exchange of active constraints is necessary):
     $x_{k+1} = x_k + s_k d_k, x_{k+1} = (y_{k+1}, p_{k+1}, q_{k+1})$;
     $g_{k+1} = 2(\beta^{scal}_i(y_{k+1} - y_{ref}) + \alpha^{scal}_i y^i_{k+1}, p_{k+1} - 1, q_{k+1} - 1)$;
     $\lambda_k = LLS(r_{k+1}, m_{k+1}, g_k, Y_k, L_k)$.
     Release a direction having the highest optimization potential:

$$\lambda_k^{j0}; = \min_j \text{ }^j_{\lambda_k};$$

Update matrix factorizations and index quantity:
$(\tilde{r}_k, \tilde{m}_k, \tilde{J}_k, \tilde{Y}_k, \tilde{Z}_k, \tilde{L}_k, \tilde{S}_k) := \Phi^A_-(j0, r_k, m_k, J_k, Y_k, Z_k, L_k, S_k)$.
Activate constraint $j^{i0}_k$.
Update matrix factorizations and index quantity:
$(r_{k+1}, m_{k+1}, J_{k+1}, Y_{k+1}, Z_{k+1}, L_{k+1}, S_{k+1}) := \Phi^A_+(i0, \tilde{r}_k, \tilde{m}_k, \tilde{J}_k, \tilde{Y}_k, \tilde{Z}_k, \tilde{L}_k, \tilde{S}_k)$.

Check $x_{k+1}$ for optimum quality:
  If $Z^t_{k+1}g_{k+1}=0$;
  and $\lambda_{k+1}=LLS(r_{k+1},m_{k+1},g_{k+1},Y_{k+1},L_{k+1})\geq 0$
  then: Go to Step IV.
  Otherwise: k=k+1 (increase iteration index)
  If k>kmax: Go to Step IV.
  Otherwise: Determine the orthogonal, regular triangular factorization of
  $\overline{Z}:=\Lambda Z_{k+1}$:
  $(Q^Z_{k+1},R^Z_{k+1}):=\Phi^Z(\overline{Z},r_{k+1})$.
  Go to Step I.

(b) If $s_k=1$ (no new active constraint).
  $x_{k+1}=x_k+d_k, x_{k+1}=(y_{k+1},p_{k+1},q_{k+1})$;
  $g_{k+1}=2(\beta^{scal}_i(y_{k+1}-y_{ref})+\alpha^{scal}_i y_{k+1},p_{k+1}-1,q_{k+1}-1)$.
  Update matrix factorizations and index quantity:
  $(r_{k+1},m_{k+1},J_{k+1},Y_{k+1},Z_{k+1},L_{k+1},S_{k+1}):=(r_k,m_k,J_k,Y_k,Z_k,L_k,S_k)$.
  Check $x_{k+1}$ for optimum quality:
  If $Z^t_{k+1}g_{k+1}=0$;
  and $\lambda_{k+1}:=LLS(r_{k+1},m_{k+1},g_{k+1},Y_{k+1},L_{k+1})\geq 0$
  then: Go to Step IV.
  Otherwise: Release a direction having the highest optimization potential:

$$\lambda^{j0}_k := \min_j \lambda^j_k;$$

Update matrix factorizations and index quantity:
  $(r_{k+1},m_{k+1},J_{k+1},Y_{k+1},Z_{k+1},L_{k+1},S_{k+1}=\Phi^A_-(j0,r_k,m_k,J_k,Y_k,Z_k,L_k,S_k)$.
  k=k+1 (increase iteration index)
  If k>kmax: Go to Step IV.
  Otherwise: Determine the orthogonal, regular triangular factorization of $\overline{Z}:=\Lambda Z_{k+1}$:
  $(Q^Z_{k+1},R^Z_{k+1}):=\Phi^Z(\overline{Z},r_{k+1})$
  Go to Step I.

IV. Solution $x_{k+1}$ is determined. Stop!
End of algorithm of inverse kinematics.

Definition of the function LLS:

$\lambda=LLS(r,m,g,Y,L)$.

$\lambda_i:=0, i=r+1,\ldots,m$;

$\lambda_{nL}:=(\lambda_{r+1},\ldots,\lambda_m)$;

$L^t\lambda_L=Y^t g$.

From this, determine $\lambda_L\in\mathfrak{R}^r$ through reverse substitution. Define the output value of the function:
$\lambda:=(\lambda_L,\lambda_{nL})$.
With $I_{eq}:=1+\max_{1\leq i\leq m}|\lambda(i)|$, set the components of $\lambda$ that are among the secondary conditions of Equation (1) at the value $l_{eq}$.
End of the function LLS.

Definition of the function $\Phi_+$:
$(\bar{r},\bar{m},\bar{J},\bar{Y},\bar{Z},\bar{L},\bar{S})=\Phi^A_+(i0,r,m,J,Y,Z,L,S)$.
Activate constraint $j^{i0}$. The $j^{i0}$-th line of A is indicated by $\alpha_{j0}$' with $j0:=j^{i0}$.
Define $Q^1:=(Y,Z)$ and form $\bar{\alpha}:=Q\alpha_{j0}$. Partition $\bar{\alpha}:=(\bar{\alpha}_Y,\bar{\alpha}_Z)$ with $\bar{\alpha}_Y\in\mathfrak{R}^r$ and $\bar{\alpha}_Z\in\mathfrak{R}^{n-r}$.
Determine the Householder reflection $\tilde{H}\in\mathfrak{R}^{n-r,n-r}$ so that:

$|\overline{\alpha}_Z|e_1=\tilde{H}\overline{\alpha}_Z$, with $e_1:=(1,0,\ldots,0)\in\mathfrak{R}^{n-r}$. Define the unitary transformer $H\in\mathfrak{R}^{n,n}$ according to:

$$H := \begin{pmatrix} I_r, & 0 \\ 0, & \tilde{H} \end{pmatrix}.$$

Define the unitary transformer:

$\overline{Q}:=HQ$;

Update indices:

$$\bar{r} := \begin{cases} r & \text{if } |\bar{a}_z| = 0; \\ r+1 & \text{otherwise} \end{cases}$$

$\bar{m} := m + 1$;

exchange: constraints:
If $\bar{r} \neq r$, then $$\bar{j}^i := \begin{cases} j^{i0} & \text{if } i = \bar{r} \\ j^{\bar{m}} & \text{if } i = i0 \\ j^{\bar{r}} & \text{if } i = \bar{m} \\ j^i & \text{otherwise} \end{cases}.$$

otherwise $$\bar{j}^i := \begin{cases} j^{i0} & \text{if } i = \bar{m} \\ j^{\bar{m}} & \text{if } i = i0 \\ j^i & \text{otherwise} \end{cases}.$$

$\bar{J} := (\bar{j}^1,\ldots,\bar{j}^{2n+6})$.

Update matrix factorizations:

$\bar{Y}$ is the partial matrix of $\bar{Q}^t$ that includes columns 1 through $\bar{r}$ of $\bar{Q}^t$.

$\bar{Z}$ is the partial matrix of $\bar{Q}^t$ that includes columns $\bar{r}+1$ through n of $\bar{Q}^t$.

$$\bar{L}:=\begin{pmatrix} L, & 0 \\ \bar{a}_Y, & |\bar{a}_z| \end{pmatrix};$$

$$\bar{S}:=\begin{cases} S, \bar{a}_Y & \text{if } \bar{r} = r \\ S & \text{otherwise} \end{cases}.$$

End of the function $\Phi_+$.
Definition of the function $\Phi_-$:
$(\bar{r},\bar{m},\bar{J},\bar{Y},\bar{Z},\bar{L},\bar{S})=\Phi^A_-(i0,r,m,J,Y,Z,L,S)$.
Inactivate constraint $j^{i0}$.
If j0>r: (Eliminate singular, active secondary condition)

Update indices:
 $\underline{r}:=r$;
 $\underline{m}:=m-1$;
Exchange constraints:

$$\bar{j}^i := \begin{cases} j^{j0} & \text{if } i = \bar{m}+1 \\ j^{\bar{m}+1} & \text{if } i = j0 \\ j^i & \text{otherwise} \end{cases}.$$

$\bar{J} := (\bar{j}^1, \ldots, \bar{j}^{2n+6})$.

Update matrix factorizations:
 $\bar{Y}:=Y$;
 $\bar{Z}:=Z$;
 $\bar{L}:=L$;
 $\bar{S}:=(S_1, \ldots, S_{j0-r-1}, S_{j0-r+1}, \ldots, S_{m-r})$,
where $S_i$ indicate the S columns.

If $j0 \leq r$: (Eliminate regular, activate constraint)
 $\tilde{R}$ results from $R:=L^1$ through striking of the j0-th column. The elements of $\tilde{R}$ that occur at the locations $(j0,j0+1)$, $(j0+1\ j0+2)$, ..., $(r,r+1)$ are canceled through left multiplication with a sequence of unitary elimination matrices
 $\tilde{E}_{j0,j0+1}, \ldots, \tilde{E}_{r-1,r} \in \Re^{r,r}$. Define linear transformers:
 $\hat{R}:=\tilde{E}_{r-1,r}\tilde{E}_{r-2,r-1} \cdots \tilde{E}_{j0,j0+1}\tilde{R}$;
 $\hat{S}:=\tilde{E}_{r-1,r}\tilde{E}_{r-2,r-1} \cdots \tilde{E}_{j0,j0+1}\tilde{S}$;

$$E_{i,i+1} := \begin{pmatrix} \tilde{E}_{i,i+1}, & 0 \\ 0, & I_{n-r} \end{pmatrix};$$

$Q^t:=(Y,Z)$;
$\bar{Q}:=E_{r-1,r}E_{r-2,r-1} \cdots E_{j0,j0+1}Q$;
If the last line of $\hat{S}$ is zero, or if $r=m$:
update indices:
 $\bar{r}:=r-1$;
 $\bar{m}:=m-1$;
Exchange constraints:

$$\bar{j}^i := \begin{cases} j^{j0} & \text{if } i = \bar{m}+1 \\ j^{i+1} & \text{if } i = j0, \ldots, \bar{m} \\ j^i & \text{otherwise} \end{cases}.$$

$\bar{J} := (\bar{j}^1, \ldots, \bar{j}^{2n+6})$.

Update matrix factorizations:
 $\bar{Y}$ is the partial matrix of $\bar{Q}^t$ that contains columns 1 through $\bar{r}$ of $\bar{Q}^t$.
 $\bar{Z}$ is the partial matrix of $\bar{Q}^t$ that contains columns $\bar{r}+1$ through n of $\bar{Q}^t$. If $r>m$, stroke the last line of $\hat{S}$ and $\hat{R}$. Set:

$\bar{L}:=\hat{R}^t$;
 $\bar{S}:=\hat{S}$;

Otherwise (convert singular, active constraint into a regular, active constraint):
Determine the element of the last line of $\hat{S}$ with the smallest index l0 such that:

$\hat{S}_{r,l0} \neq 0$.

Exchange column l0 and column 1 of $\hat{S}$. Define linear transformer:

$\bar{R}:=(\hat{R},\hat{S}_{l0})$, where $\hat{S}_{l0}$ indicates the l0-th column of $\hat{S}$.
Update indices:

$\bar{r}:=r$;

$\bar{m}:=m-1$;

Exchange constraints:

$$\hat{j}^i := \begin{cases} j^{j0} & \text{if } i = \bar{m}+1 \\ j^{i+1} & \text{if } i = j0, \ldots, \bar{m} \\ j^i & \text{otherwise} \end{cases}.$$

$$\bar{j}^i := \begin{cases} \hat{j}^{\bar{r}+l0-1} & \text{if } i = \bar{r} \\ \hat{j}^{\bar{r}} & \text{if } i = \bar{r}+l0-1 \\ \hat{j}^i & \text{otherwise} \end{cases}.$$

$\bar{J} := (\bar{j}^1, \ldots, \bar{j}^{2n+6})$.

Update matrix factorizations:
 $\bar{Y}$ is the partial matrix of $\bar{Q}^t$ that includes columns 1 through $\bar{r}$ of $\bar{Q}^t$.
 $\bar{Z}$ is the partial matrix of $\bar{Q}^t$ that includes columns $\bar{r}+1$ through n of $\bar{Q}^t$.

$\bar{L}:=R^t$;

$\bar{S}:=(\hat{S}_2, \ldots, \hat{S}_{l0-1}, \hat{S}_1, \hat{S}_{l0+1}, \ldots, \hat{S}_{m-r})$, End of the function $\Phi$.

Definition of the function $\Phi^A_0$:
 $(\bar{r},\bar{J},\bar{Y},\bar{Z},\bar{L},\bar{S}):=\Phi^A_0(\hat{A},m,J)$.
1. Define:

$A^0:=\hat{A}$, $i:=0$.

2. Define the following matrix recursion:

$A_{i+1}:=H_iA^i, i \geq 0$.

The unitary transformer $H_i \in \Re^{n,n}$ is explained as follows:

$$H := \begin{pmatrix} I_i, & 0 \\ 0, & \tilde{H}_i \end{pmatrix}.$$

The Householder reflection $\tilde{H}_i \in \Re^{n-i,n-i}$ is defined such that:

$|\alpha^i_{k0}|e_l=\tilde{H}_i\alpha^i_{k0}$.

with $e_1:=(1,0, \ldots, 0) \in \Re^{n-i}$. Here the vectors $\alpha^i_k \in \Re^{n-i}, k=1, \ldots, n-i$ indicate the columns of the matrix $\tilde{A}^i \epsilon \Re^{n-i,m-i}$:

$$A^i := \begin{pmatrix} *, & * \\ *, & \tilde{A}^i \end{pmatrix}.$$

Moreover, $1 \leq k0 \leq n-i$ is the smallest index with $\alpha^i_{k0} \neq 0$. If no such k0 exists, then go to Step III; otherwise, go to Step IV.

3. Define indices:

$$\bar{r} := i;$$

$$\bar{j} := (\bar{j}, \ldots, \bar{j}^{2n+6}).$$

Define matrix factorizations:

$$\bar{Q} := H_{\bar{r}-1} H_{\bar{r}-2} \ldots H_0;$$

$\bar{Y}$ is the partial matrix of $\bar{Q}^t$ that includes columns 1 through $\bar{r}$ of $\bar{Q}^t$.

$\bar{Z}$ is the partial matrix of $\bar{Q}^t$ that includes columns $\bar{r}+1$ through n of $\bar{Q}^t$.

T is the matrix that results from the stroking of lines $\bar{r}+1$ through n from $A^{i+1}$.

Define $\bar{L} \epsilon \Re^{\bar{r},\bar{r}}$, and $\bar{S} \epsilon \Re^{\bar{r},m-\bar{r}}$, according to:

$$(\bar{L}, \bar{S}) := T.$$

Stop: Function $\Phi^A_0$ has been performed completely!

4. Exchange column i+k0 with column i+1 in $A^i$.

$$\bar{j}^k := \begin{cases} j^{i+k0} & \text{if } k = i+1 \\ j^{i+1} & \text{if } k = i+k0 \\ j^k & \text{otherwise} \end{cases}$$

Set $j^k := \bar{j}^k \forall k$, increase the counting index i=i+1 and go to Step II.

End of function $\Phi^A_0$.

Definition of function $\Phi^Z_0$:

$$(Q^Z, R^Z) := \Phi^Z_0(\bar{Z}, r).$$

Determine the QR triangular factorization of $\bar{Z}$:

$$Q^Z \bar{Z} = \begin{pmatrix} R^Z \\ 0 \end{pmatrix}.$$

Here $Q^Z \epsilon \Re^{n,n}$ indicates a unit matrix, and $R^Z \epsilon \Re^{r,r}$ indicates an upper triangular matrix.

End of function $\Phi^Z_0$.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it it intended that such expressions be given their broadest interpretation.

What is claimed is:

1. A method of command control, by a programmer, for interactive path guidance of a kinematically-redundant manipulator based on end-effector destination shifts from the programmer, in connection with a calculation of articulated-position values according to an algorithm of inverse kinematics; the method comprising the steps of:

providing a manual control device;

calculating a new articulation position ($q_{i+1}$) from an end-effector destination shift command from the control device and a current articulation position actual value ($q_i$) of the manipulator;

the calculating step including as calculating factors a quality function (f(q)), which is parameterized by non-negative weighting values ($\alpha_j$, $\beta_j$) and path limitations through physical articulation stops ($q_{min}$, $q_{max}$), maximum articulation speed ($\dot{q}_{max}$), and a kinematic equation represented by the Jacobi Matrix;

calculating an energy criterion from
$(q-q_i)^t \text{diag}(\alpha_j)(q-q_i)$ calculating a reference-position criterion from
$(q-q_{ref})^t \text{diag}(\beta_j)(q-q_{ref})$ predetermining by the new articulation position new values for an articulation regulator, with the quality function being a sum of the energy criterion and the reference-position criterion;

determining a value $q_{ref}$ as a predetermined articulation-position value such that a sequence of calculated articulation-position values ($q_i$) runs near a value of the reference-position criterion;

determining an allowable optimization vector, beginning with one of the articulation-position values $q_i$ as a starting point, on the basis of the quality function with respect to all active constraints that indicate which path limitations have been attained;

scaling the allowable optimization vector according to inactive constraints that indicate which path limitations have not been attained;

adding the scaled optimization vector to the articulation-position value calculated in the previous step of the iteration;

evaluating an optimum quality of the articulation-position values based on the quality function and the constraints activated in the newly-calculated articulation position.

2. The method according to claim 1, in which the control device comprises a control ball.

3. The method according to claim 1, further comprising steps of:

defining by use of the Jacobi Matrix of kinematics predetermined cartesian translational or rotary end-effector destination shift $\Delta x^d_t$ and $\Delta x^d_r$ per sampling time $\Delta T$ starting with a commanded end-effector destination shift $\Delta x_c := (\Delta x_t, \Delta x_r)$ at a time $T_i$, with $\Delta x_t \in \mathfrak{R}^3$ and $\Delta x_r \in \mathfrak{R}^3$ respectively indicating a translational or rotary component of the commanded end-effector destination shift, and $\Delta x^{max}_t$ and $\Delta x^{max}_r$ respectively defining a maximum scalar-valued, translational or rotary, cartesian position offset of the end effector per sampling time $\Delta T$:

$$\Delta x^d_t := \begin{cases} \Delta x_t & \text{if } |\Delta x_t| \leq \Delta x^{max}_t \\ \Delta x_t \frac{|\Delta x_t|}{\Delta x^{max}_t} & \text{otherwise} \end{cases}$$

$$\Delta x^d_r := \begin{cases} \Delta x_r & \text{if } |\Delta x_r| \leq \Delta x^{max}_r \\ \Delta x_r \frac{|\Delta x_r|}{\Delta x^{max}_r} & \text{otherwise} \end{cases}$$

determining a quantity $|x|$ of a vector x by its euclidian norm $$|x| = \sqrt{\left(\sum_i x_i^2\right)},$$

wherein the desired end-effector destination shift is given by $\Delta x_d := (\Delta x^d_t, \Delta x^d_r)$, and the energy criteria and reference-position criteria are suitably weighted corresponding to predominant, problem-specific requirements in that each axis j is allocated two positive numerical values $\alpha_j$, $\beta_j$, which are predetermined by the programmer, with the value $\alpha_j$ serving as the weighting of an energy criterion that evaluates a difference between two adjacent, calculated articulation positions of axis j, and the value $\beta_j$ serving as the weighting of a criterion that evaluates deflection of the articulation position $q_j$ from a reference value $q_{ref\,j}$, which is also predetermined by the programmer, similar to the physical articulation stops $q_{min}$, $q_{max}$ of the manipulator, which relate to path limitations, and calculating the articulation-speed limitations $q'_{max}$, such that an allowable, optimum articulation-position offset $\Delta q^i$ is calculated in attaining output values to effect a desired end-effector destination shift $\Delta x^i_d$ at time $T_{i-1}$ during the time interval $\Delta T$, with an algorithm of inverse kinematics that progresses in an initialization phase and a subsequent optimization phase, the current nominal value being provided to the articulation regulators from $q^{i+1}_{soll} := q^i_{soll} + \Delta q^i$ (the articulation regulators correspondingly proceed with $q^i_{soll}$), with allowable articulation-position offset implying that the articulation-position value that has been updated with $\Delta q$ satisfies the physical articulation stops $q_{min}$, $q_{max}$ corresponding to $q_{min} \leq q_{soll} + \Delta q \leq q_{max}$, and $\Delta q$ satisfies the articulation speed limitations $q'_{max}$ corresponding to $|\Delta q| \leq q'_{max}\Delta T$, and that the type of optimum quality of $\Delta q$ is determined by the programmer through the quality-criterion weighting $\alpha$, $\beta$, and the sampling time $\Delta T$ is dimensioned, corresponding to $\Delta T \geq \max(\Delta t_q, \Delta t_r)$;

whereby computing time $\Delta t_q$ for calculating an optimum, allowable articulation-position offset $\Delta q$, and an adjustment time $\Delta t_r$, which the regulators require for adapting axial positions to the nominal values $q_{soll}$, lie within the time span $\Delta T$.

4. The method according to claim 3, characterized in that the cartesian end-effector destination shift $\Delta x_c$ commanded at a time $T_i$ by the programmer is commanded in the form of a 6-dimensional increment vector.

5. The method according to claim 3, characterized in that the increment vector of the cartesian end-effector destination shift $\Delta x_c$ commanded at a time $T_i$ is commanded by the programmer through a difference formation between absolute end-effector coordinates.

* * * * *